3,071,207
LUBRICATION SYSTEM FOR HIGH TEMPERATURE ENVIRONMENTS
Paul Lewis, Scotia, and Sylvester F. Murray, Schenectady, N.Y., assignors to General Electric Company, a corporation of New York
Filed Aug. 25, 1960, Ser. No. 51,875
8 Claims. (Cl. 184—1)

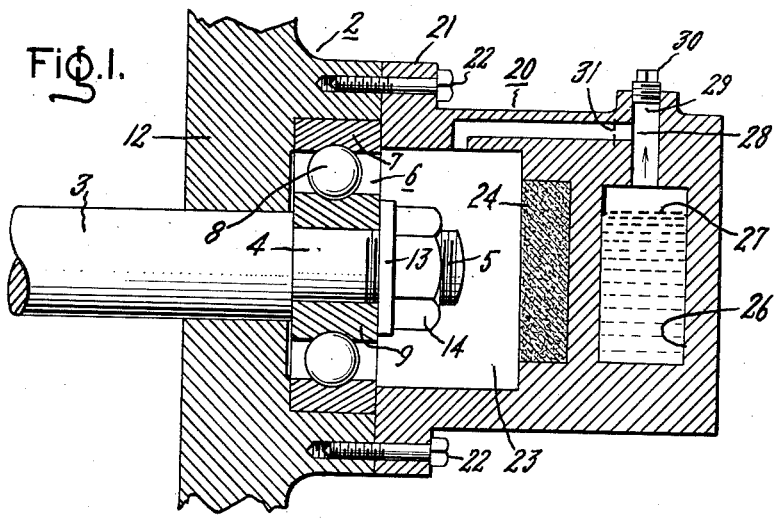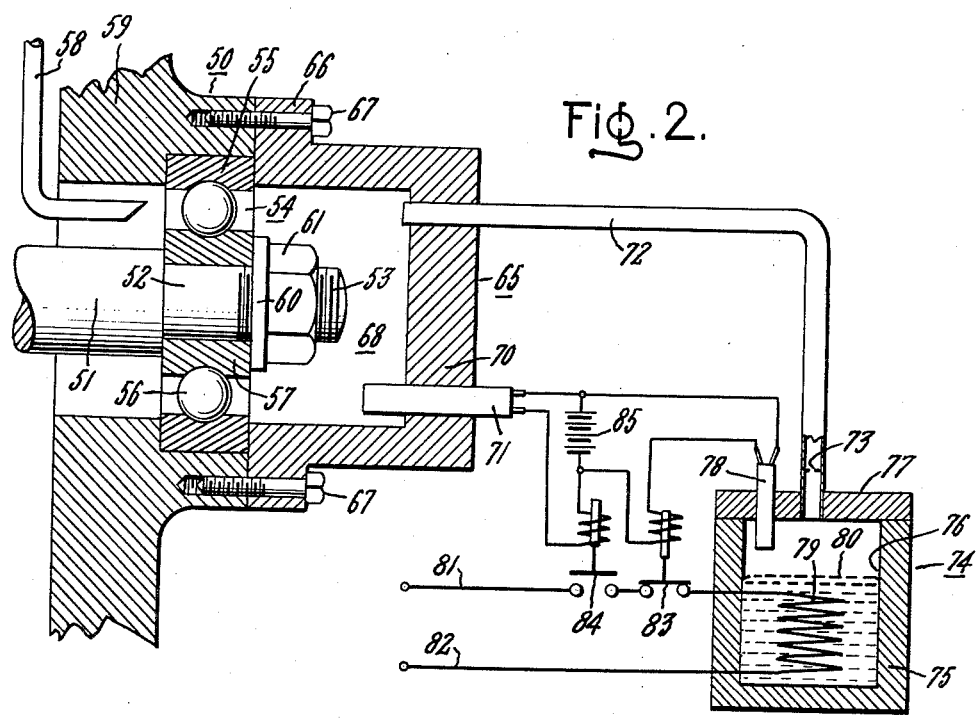
Inventors
Paul Lewis
Sylvester F. Murray
by Paul A. Franke
Their Attorney

United States Patent Office 3,071,207
Patented Jan. 1, 1963

The present invention relates to lubrication systems and, more particularly, to lubrication systems for bearings operating in high temperature environments.

With the rapid advance in many technologies, apparatus have been required to operate at increasingly higher temperatures and speeds. These requirements have, in many instances, outpaced developments in bearing and lubricant systems commonly utilized in such apparatus. In many instances, it has become impossible for manufacturers to select a system design with assurance of satisfactory performance. An example of such conditions exists in the aircraft field wherein devices such as aircraft electrical generators experience unusually severe temperature conditions. It is known that the skin temperature of an aircraft flying at mach 2.5 will experience skin temperatures in excess of 700° F. Most lubricants are subject to oxidation at high temperatures leaving a residue of carbonaceous material resulting in failure of the bearing and the apparatus in which it is being used.

The present invention envisions a lubrication system wherein the lubricant is protected during high temperature intervals from failure due to oxidation.

The chief object of the present invention is to provide an improved lubrication system for use in elevated temperature environments.

Another object of the invention is to provide a lubrication system for a bearing with means for protecting the lubricant from oxidation at high temperatures.

A still further object of the invention is to provide a lubrication system having lubricant protecting means which are applied in response to the temperature in the area adjacent the lubricant.

These and other objects of our invention will be more readily perceived from our description.

One of the features of the present invention is a lubrication system for a bearing including means for supplying lubricant to the bearing, a source of inert gas and means for supplying the inert gas to the area adjacent the lubricant to blanket the lubricant in response to the temperature in this area.

The attached drawing illustrates preferred embodiments of the invention in which:

FIG. 1 is a view in section of a lubrication system employing the present invention, and FIG. 2 is a view in section of another embodiment of the invention shown in FIG. 1.

In FIG. 1 there is shown a sectional view of a bearing block arrangement 2 employing the present invention. The construction includes a shaft 3 having a reduced section 4 terminating in a threaded portion 5. A ball bearing 6 is mounted on the reduced section 4 and includes the outer race 7, balls 8 and cone 9. If desired, a suitable cage or separator may be associated with balls 8. Cone 9 is affixed to the reduced portion 4 by means of a washer 13 and nut 14.

Bearing cap 20 is provided to support the needed source of lubricant and an inert gas source. Bearing cap 20 includes a flange portion 21 having suitable openings therein to permit fastening of cap 20 by means of bolts 22 to housing 12. Adjacent bearing 6 is a chamber 23 formed by cap 20. Flange portion 21 and bolts 22 form locking means for retaining race 7 of bearing 6 in housing 12. It will be noted that cone 9 of the bearing is fastened to the shaft and race 7 is fastened to the housing.

Suitable lubricant supply means may be provided in the cap of the embodiment shown in FIG. 1. A recess is formed in the cap to retain a porous member 24 which may be fabricated of a suitable ceramic or metal to retain lubricant. The lubricant is released over a period of time to supply constant lubrication to the contacting parts of bearing 6 during operation.

In aircraft apparatus when temperatures exceeding 500° are encountered, there is a tendency for the lubricant to oxidize, resulting in bearing failure for lack of lubrication. The present invention provides means to blanket the lubricant with an inert gas to avoid bearing lubricant oxidation at elevated temperatures. This means may include a chamber 26 having a suitable material 27 therein, described more fully hereinafter, chamber 26 being connected by passage 28 to chamber 23. Passage 28 may be provided with a suitable orifice 31 for the purpose of metering the inert gas generated into chamber 26. Passage 28 may be connected to a supply passage 29 through which material 27 is supplied to chamber 26. A plug 30 threadingly engages and closes passage 29.

The material 27 may be of any suitable type which at elevated temperature vaporizes to form an inert gas. The gas so generated passes through line 28 through orifice 31 which meters the gas flow passed into chamber 23, substantially blanketing the lubricant which is in contact with the bearing to assure continuous successful operation of the bearing at elevated temperatures. Examples of solids which may be utilized are anthraquinone which will sublimate at approximately 547° F., diphenylphenanthracene which sublimates at approximately 482° F., phenthiazine which sublimates at approximately 700° F., naphthalene which sublimates at approximately 176° F., and dipheylamine which sublimates at approximately 127° F. These solids when sublimating form inert gas to protect the lubricant. If desired, suitable liquids may be utilized to form an oxidatively stable fluorocarbon gas. For example, heptacosafluorotributylamine evaporates at a temperature of approximately 350° F. Other liquids which may be used are fully fluorinated tripheylamine, fluorinated biphenyl, and fluorinated biphenyl ether.

In operation, shaft 3 rotates at a substantially high speed and bearing 6 supports this load and derives lubrication from porous lubricant disc 24. Lubricant from this disc is released in quantities to maintain a film on bearing 6. Material 27 in chamber 26 is in heat transfer relation with the areas adjacent the lubricant.

When the temperature of the bearing and lubricant environment reaches a suitable level, depending upon the particular material 27 selected, the material vaporizes to form an inert gas which passes from chamber 26 through passage 28 and is metered through orifice 31 is a manner to provide an inert gas blanket in intimate contact with the lubricant to insure that substantially no oxidation or breakdown of the lubricant occurs. It will be appreciated that the protecting function will occur with anthraquinone at higher temperatures. If desired, naphthalene or diphenylamine may be utilized to achieve protection at lower temperatures.

Another embodiment of the invention shown in FIG. 2 includes a bearing block 50 adapted to support a shaft 51 having a reduced section 52 and a threaded portion 53. A ball bearing 54 is mounted on shaft 51 and in housing 59. Bearing 54 includes a race 55, balls 56 and cone 57. Cone 57 is mounted on the reduced section 52 of shaft 51 and fastened by means of washer 60 and nut 61. The race portion of the bearing is fastened to housing 59 by flange portion 66 of cap 65 which is attached to housing 59 by means of bolt 67. The flange portion 66 engages the race and urges it against the accommodating shoulder provided in housing 59. Lubricant may be supplied through line 58 to the bear surfaces.

Cap 65 when bolted to housing 59 forms a chamber 68. This cap may have a suitable opening therein for passing line 72 into chamber 68. Cap 65 may also be provided with a suitable wall 70 for accommodating temperature responsive means 71 which may be a conventional thermostatic construction. Line 72 may be associated with a suitable container 74 which includes a body 75 having a chamber 76 enclosed by cover member 77, line 72 extending through cover member 77 and placing chambers 68 and 76 in communication. If desired, a suitable orifice 73 may be placed in line 72 to meter the flow of inert gas.

If desired, suitable heating means 79, such as electrical heating means, may be mounted in container 74 to place the material 80 in chamber 76 in heat exchange relation therewith. Cover 77 may accommodate therein suitable temperature responsive means 78 provided for a purpose more fully described hereinafter.

Operation of this embodiment requires electrical energy and a suitable electrical circuit may be provided which includes lines 81 and 82 which are connected to a suitable electrical power source. This circuit includes heating means 79 and the contacts of solenoids 83 and 84. Solenoid 84 is normally open and solenoid 83 is normally closed. Electrical energy for the solenoids may be provided from battery 85. Solenoids 83 and 84 are connected in parallel circuits. The first circuit includes battery 85, temperature responsive means 71 and solenoid 84. The second circuit includes battery 85, temperature responsive means 78 and solenoid 83.

In the operation of this embodiment, bearing 54 supports shaft 51 and lubricant is supplied to the bearing surface through line 58. At elevated temperatures, it is intended that the bearing lubricant be blanketed with inert gas to prevent oxidation. This inert gas is supplied from chamber 76 of container 75 and is passed through orifice 73 through line 72 to chamber 68. Temperature responsive means 71 senses the temperature adjacent the bearing lubricant and, in response to a predetermined temperature, closes the circuit including solenoid 84 and battery 85 so that electrical heater 79 in chamber 76 is energized. This heat causes vaporization of the material 80 in chamber 76. In the event that a solid is utilized, sublimation, or melting followed by evaporation occurs, and in the event a liquid is used, evaporation occurs. The generated gas is supplied to chamber 68 and thereby produces a protecting blanket for the lubricant.

To avoid overheating of the material in chamber 76 of container 75, a second circuit which includes temperature responsive means 78, solenoid 83, and battery 85 is provided. When the temperature in chamber 76 becomes excessive, this temperature is sensed by means 78 which closes the circuit causing energization of the winding of solenoid 83. This opens the current including conductors 81 and 82, this de-energizing electrical heater 79.

By means of the second emboidment, greater versatility is achieved since the temperature at which the inert gas is supplied to blanket the lubricant is not governed by the vaporization temperature of the material used, but may be selected by suitable calibration of temperature responsive means 71. By this arrangement, blanketing of the lubricant may be performed at any desired temperature.

The present invention recognizes the effects of high temperatures on present day lubricants and attempts to make the use of these lubricants feasible at elevated temperature by blanketing or isolating the lubricant to avoid oxidation thereof. The present invention supplies means wherein, in response to temperatures which are critical to the lubricant, generation of inert gas takes place and this generation is terminated by the return to safe conditions. The selective action of this means extends the useful life range of the apparatus and also permits the incorporation of the invention in the bearing block construction, thereby achieving compactness and economy of construction.

While we have described a preferred embodiment of our invention, it will be understood that our invention is not limited thereto since it may be otherwise embodied within the scope of the appended claims.

What we claim as new and desired to secured by Letters Patent of the United States is:

1. In a lubrication system the combination of a bearing, means for supplying lubricant to said bearing, a source of inert gas, and passage means for blanketing the lubricant with the inert gas to retard oxidation of the lubricant at elevated temperatures.

2. In a lubrication system the combination of a bearing, means for supplying lubricant to said bearing, a source of inert gas and means for supplying inert gas to the area adjacent the lubricant to blanket the lubricant with an inert atmosphere in response to the temperature adjacent the lubricant.

3. The system according to claim 2 in which the source of inert gas is a solid which is vaporized to generate the blanketing atmosphere.

4. The system according to claim 2 in which the source of inert gas is a liquid which is evaporated to form an inert atmosphere.

5. In a lubrication system the combination of a bearing, means for supplying lubricant to said bearing, a material adapted to be vaporized to generate inert gas, means for vaporizing the material, and passage means for supplying the vaporized material to an area adjacent the lubricant to blanket the lubricant with inert gas in response to the temperature adjacent the lubricant.

6. In a lubrication system the combination of a bearing, means for supplying lubricant to said bearing, a material adapted to be vaporized to generate inert gas, means for placing the material in heat exchange relation with the area adjacent the lubricant whereby the material is vaporized to generate an inert gas which blankets the lubricant to restrain oxidation thereof at elevated temperatures.

7. In a lubrication system the combination of a bearing, means for supplying lubricant to said bearing, a material adapted to be vaporized to generate inert gas, heating means in heat transfer relation with the material, means for sensing the temperature adjacent the lubricant and means for energizing the heating means in response to the temperature adjacent the lubricant whereby an inert atmosphere is generated to blanket the lubricant to restrain oxidation thereof at elevated temperatures.

8. A system for lubricating a member at temperatures at which a lubricant tends to oxidize comprising a member to be lubricated, means for supplying lubricant to said member, a source of inert gas, and passage means to provide an inert atmosphere to an area adajacent the lubricant to retard oxidation of the lubricant at elevated temperatures.

References Cited in the file of this patent

UNITED STATES PATENTS

| | | |
|---|---|---|
| 2,003,163 | Warren | May 28, 1935 |
| 2,545,335 | Becker | Mar. 13, 1951 |
| 2,617,494 | Becker | Nov. 11, 1952 |
| 2,697,645 | Mitchell | Dec. 21, 1954 |
| 2,841,244 | Sorem | July 1, 1958 |
| 2,934,480 | Slomin | Apr. 26, 1960 |